US012324421B2

(12) United States Patent
Radzyner et al.

(10) Patent No.: US 12,324,421 B2
(45) Date of Patent: Jun. 10, 2025

(54) ARRAY OF GATES IN AUTOMATED BEE HABITAT

(71) Applicant: Beewise Technologies LTD, Kibbutz Beit-Haemek (IL)

(72) Inventors: Eliyah Radzyner, Sunnyvale, CA (US); Zvi Yaniv, Kfar Vradim (IL); Yavin Cafri, Kibbutz Reshafim (IL); Shlomo Frankin, Kibbutz Yehiam (IL)

(73) Assignee: Beewise Technologies LTD, Kibbutz Beit-Haemek (IL)

( * ) Notice: Subject to any disclaimer, the term of this patent is extended or adjusted under 35 U.S.C. 154(b) by 17 days.

(21) Appl. No.: 18/197,073

(22) Filed: May 14, 2023

(65) Prior Publication Data

US 2024/0000048 A1 Jan. 4, 2024

Related U.S. Application Data

(63) Continuation-in-part of application No. 17/857,071, filed on Jul. 4, 2022, now Pat. No. 11,895,989.

(51) Int. Cl.
*A01K 47/00* (2006.01)
*A01K 47/06* (2006.01)

(52) U.S. Cl.
CPC .................. *A01K 47/06* (2013.01)

(58) Field of Classification Search
CPC .............. A01K 47/00; A01K 47/06
See application file for complete search history.

(56) References Cited

U.S. PATENT DOCUMENTS

| 3,456,056 | A | 7/1969 | Reich et al. |
| 3,789,443 | A | 2/1974 | Cowen |
| 3,914,812 | A | 10/1975 | Kent |
| 3,999,237 | A | 12/1976 | Solomon |
| 6,475,061 | B1 | 11/2002 | Huang |
| 6,524,058 | B1 | 2/2003 | Watters |
| 8,602,837 | B1 | 12/2013 | Allan |

(Continued)

FOREIGN PATENT DOCUMENTS

| CN | 106719106 | 5/2017 |
| DE | 202006007269 | 8/2006 |

(Continued)

OTHER PUBLICATIONS

Notice of Allowance Dated Dec. 4, 2023 from the US Patent and Trademark Office Re. U.S. Appl. No. 17/857,071. (5 pages).

(Continued)

*Primary Examiner* — Joshua J Michener
*Assistant Examiner* — Henry Hooper Mudd

(57) ABSTRACT

Disclosed herein is a system for controlling one or more arrays of bee passage gates in an automated bee habitat, comprising one or more gate arrays comprising a plurality of gates to one or more chambers of an automated bee habitat, each of the gates is individually moveable, independently of all other gates, to set a size of a respective one of a plurality of openings configured for bees passage to the one or more chambers, one or more mechanisms adapted to control each of the plurality of gates independently of the other gates, and a controller adapted to operate the one or more mechanisms to control one or more of the plurality of gates to set the size of the respective openings.

20 Claims, 6 Drawing Sheets

(56) References Cited

U.S. PATENT DOCUMENTS

| | | | |
|---|---|---|---|
| 10,645,910 B1 | 5/2020 | Gonzalez | |
| 10,757,921 B1 | 9/2020 | Wood | |
| 2002/0086430 A1 | 7/2002 | Hopmeier | |
| 2012/0202403 A1 | 8/2012 | Sinanis et al. | |
| 2014/0212520 A1 | 7/2014 | Del Vecchio | |
| 2014/0370781 A1 | 12/2014 | Anderson et al. | |
| 2015/0049919 A1* | 2/2015 | Humal | A01K 51/00 |
| 2016/0015007 A1 | 1/2016 | Sinanis | |
| 2017/0064931 A1 | 3/2017 | Tagliaferri | |
| 2017/0079249 A1* | 3/2017 | Chapa | A01K 47/06 |
| 2017/0360010 A1* | 12/2017 | Wilson-Rich | A01K 47/06 |
| 2018/0160656 A1 | 6/2018 | Ben-Shimon et al. | |
| 2018/0288977 A1 | 10/2018 | Hummer et al. | |
| 2020/0267945 A1 | 8/2020 | Symes et al. | |
| 2020/0349397 A1 | 11/2020 | Criswell et al. | |
| 2021/0084868 A1* | 3/2021 | Rice | A01K 47/02 |
| 2021/0161107 A1 | 6/2021 | Gamberoni et al. | |
| 2021/0289765 A1 | 9/2021 | Scofield et al. | |
| 2022/0022429 A1 | 1/2022 | Hummer et al. | |
| 2023/0284599 A1* | 9/2023 | Pollock | A01K 51/00 |

FOREIGN PATENT DOCUMENTS

| | | | |
|---|---|---|---|
| DE | 102013006265 | 10/2014 | |
| IT | UB20159742 | 6/2017 | |
| KR | 10-2012-0060253 | 6/2012 | |
| KR | 20230027758 A * | 2/2023 | A01K 47/06 |
| WO | WO 2012/108857 | 8/2012 | |
| WO | WO 2019/092731 | 5/2019 | |

OTHER PUBLICATIONS

Advisory Action Before the Filing of An Appeal Brief Dated May 24, 2023 from US Patent and Trademark Office Re. U.S. Appl. No. 17/857,071. (4 pages).

European Search Report and the European Search Opinion Dated Feb. 2, 2023 From the European Patent Office Re. Application No. 22197442.1. (7 Pages).

Final Official Action Dated Feb. 14, 2023 From the US Patent and Trademark Office Re. U.S. Appl. No. 17/857,071. (25 Pages).

Interview Summary Dated Dec. 20, 2022 From the US Patent and Trademark Office Re. U.S. Appl. No. 17/857,071. (3 Pages).

Interview Summary Dated Sep. 25, 2023 from the US Patent and Trademark Office Re. U.S. Appl. No. 17/857,071. (2 pages).

Official Action Dated Apr. 4, 2022 From the US Patent and Trademark Office Re. U.S. Appl. No. 16/872,769. (64 Pages).

Official Action Dated Apr. 4, 2022 From the US Patent and Trademark Office Re. U.S. Appl. No. 16/872,769. (64 Pages).

Official Action Dated Oct. 20, 2022 from the US Patent and Trademark Office Re. U.S. Appl. No. 17/857,071. (27 pages).

Official Action Dated Nov. 21, 2022 From the US Patent and Trademark Office Re. U.S. Appl. No. 17/737,147. (59 Pages).

Official Action Dated Jul. 31, 2023 from the US Patent and Trademark Office Re. U.S. Appl. No. 17/857,071. (31 pages).

\* cited by examiner

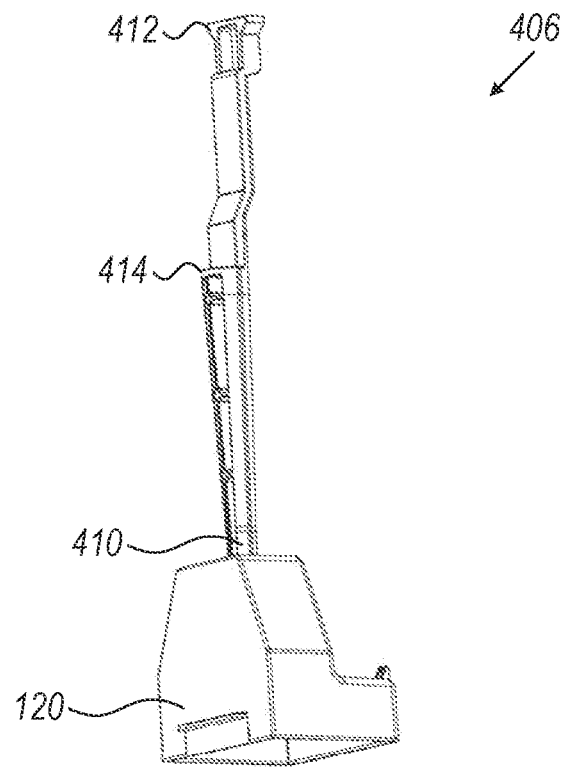
FIG. 5
FIG. 6
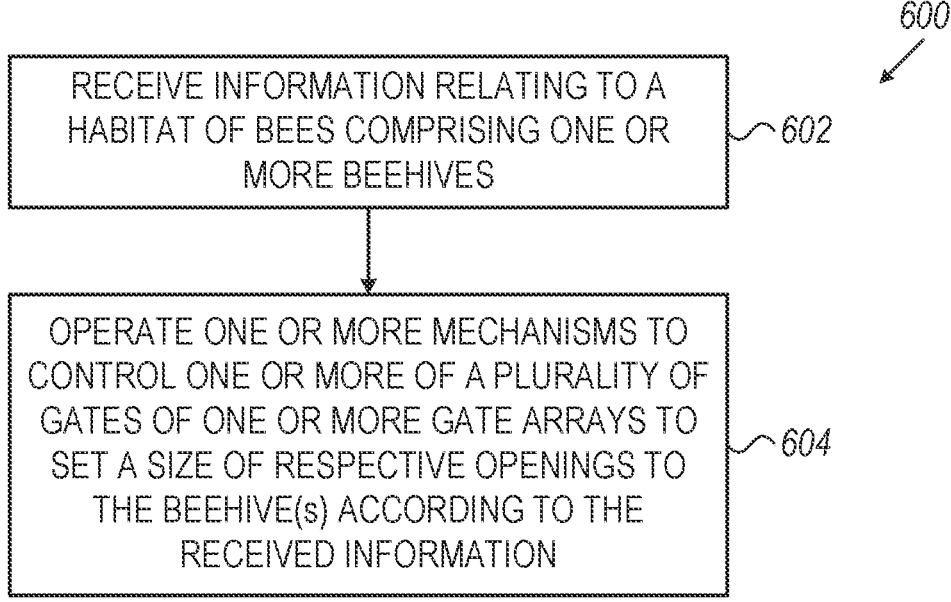

ARRAY OF GATES IN AUTOMATED BEE HABITAT

RELATED APPLICATION(S)

This application is a Continuation-in-Part (CIP) of U.S. patent application Ser. No. 17/857,071 filed on Jul. 4, 2022.

BACKGROUND

The present invention, in some embodiments thereof, relates to controlling bee passage gates in a bees' habitat comprising one or more beehives, and, more specifically, but not exclusively, to controlling bee passage gates in a bees' habitat comprising one or more beehives where each of the gates is individually, and automatically, moveable separately from the other gates.

Honeybees are vital in ecological systems and major economic value due to their essential role in pollination-based agriculture. Due to the declining population of honeybees and the need for efficient and sustainable beekeeping practices, major resources and efforts have been invested in recent years in attempt to improve honeybees' cultivation and increase productivity, efficiency, scalability, and/or safety of beehives.

Automated beehives have therefore become an increasingly important area of focus and importance as they may incorporate technology to automatically monitor, control and/or manage beehives and their bee colonies which may significantly reduce time consuming and labor-intensive manual intervention, for inspection and/or manipulation of the hives as common in traditional beekeeping.

SUMMARY

According to a first aspect of the present invention there is provided a system for controlling one or more arrays of bee passage gates in an automated bee habitat, comprising one or more gate arrays comprising a plurality of gates to one or more chambers of an automated bee habitat, each of the gates is individually moveable, independently of all other gates, to set a size of a respective one of a plurality of openings configured for bees passage to the one or more chambers, one or more mechanisms adapted to control each of the plurality of gates independently of the other gates, and a controller adapted to operate the one or more mechanisms to control one or more of the plurality of gates to set the size of the respective openings.

According to a second aspect of the present invention there is provided a method of controlling one or more arrays of bee passage gates in an automated bee habitat, comprising, comprising using one or more controllers deployed in an automated bee habitat and adapted to execute a code. The code comprising code instructions to operate one or more mechanisms adapted to control one or more gate array comprising a plurality of gates each associated with a respective one of a plurality of openings configured for bees passage to one or more chambers of an automated bee habitat. Each of the plurality of gates is individually moveable, independently of all other gates, to set a size of a respective associated opening of the plurality of openings.

In a further implementation form of the first, and/or second aspects, each of the plurality of gates is individually moveable to set the size of the respective opening in a predefined range.

In a further implementation form of the first, and/or second aspects, the predefined range extends between a minimal size in which the respective opening is fully closed and a maximal size in which the respective opening is fully open.

In a further implementation form of the first, and/or second aspects, at least some of the plurality of gates are each individually moveable to set different sizes of respective at least some openings.

In a further implementation form of the first, and/or second aspects, one or more of the mechanisms is adapted to jointly control the plurality of gates together to set a common size of the plurality of openings.

In an optional implementation form of the first, and/or second aspects, the system comprises a plurality of gates arrays each comprising a respective plurality of gates moveable to set the size of a respective plurality of openings to a respective chamber of the bee habitat. The gates of each of the plurality of gate arrays are controllable independently of any other one of the plurality of gate arrays.

In a further implementation form of the first, and/or second aspects, one or more of the mechanisms comprise one or more actuators mechanically coupled to each of the plurality of gates via a rod having a distal end mechanically coupled to the respective gate and a proximal end releasable coupled to one or more of the actuators for moving the rod to set the size of the respective opening.

In a further implementation form of the first, and/or second aspects, one or more of the mechanisms comprise one or more electromagnetic elements operable to induce a magnetic field having a vector for moving one or more magnetic elements mechanically coupled to each of the plurality of gates for moving the respective gate to set the size of the respective opening.

In a further implementation form of the first, and/or second aspects, one or more of the mechanisms comprise one or more elastic elements mechanically coupled to each of the plurality of gates. The one or more elastic elements are extendable and retractable for moving the respective gates to set the size of the respective openings.

In a further implementation form of the first, and/or second aspects, one or more of the chambers comprise one or more sets of honeycombs frames.

In a further implementation form of the first, and/or second aspects, the controller is adapted to operate the one or more mechanisms to control one or more of the plurality of gates to set the size of the respective openings according to bee traffic information derived from sensory data captured by one or more sensors deployed to monitor the automated bee habitat.

In a further implementation form of the first, and/or second aspects, the controller is adapted to operate the one or more mechanisms to control one or more of the plurality of gates to set the size of the respective openings according to one or more environmental conditions relating to an external environment of the automated bee habitat.

In a further implementation form of the first, and/or second aspects, the controller is adapted to operate the one or more mechanisms to control one or more of the plurality of gates to set the size of the respective openings according to one or more constraints defining one or more environment condition in the one or more chambers.

In a further implementation form of the first, and/or second aspects, the controller is adapted to operate the one or more mechanisms to control one or more of the plurality of gates to set the size of the respective opening in response to detection of one or more threats to the automated bee habitat.

In a further implementation form of the first, and/or second aspects, the controller is adapted to operate the one or more mechanisms to control one or more of the plurality of gates to set the size of the respective openings in response to detection of distribution of one or more potentially harmful substances in a vicinity of the automated bee habitat.

In a further implementation form of the first, and/or second aspects, the controller is adapted to operate the one or more mechanisms to control one or more of the plurality of gates to set the size of the respective openings in preparation for one or more maintenance operations in the automated bee habitat.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings:

FIG. 5 is a schematic illustration of exemplary robot adapted to releasable attach and control individually moveable gates to a habitat of bees comprising one or more beehives, according to some embodiments of the present invention; and FIG. 6 is a flowchart of an exemplary process of controlling individually moveable gates to a habitat of bees comprising one or more beehives, according to some embodiments of the present invention.

DETAILED DESCRIPTION

Figure 1:
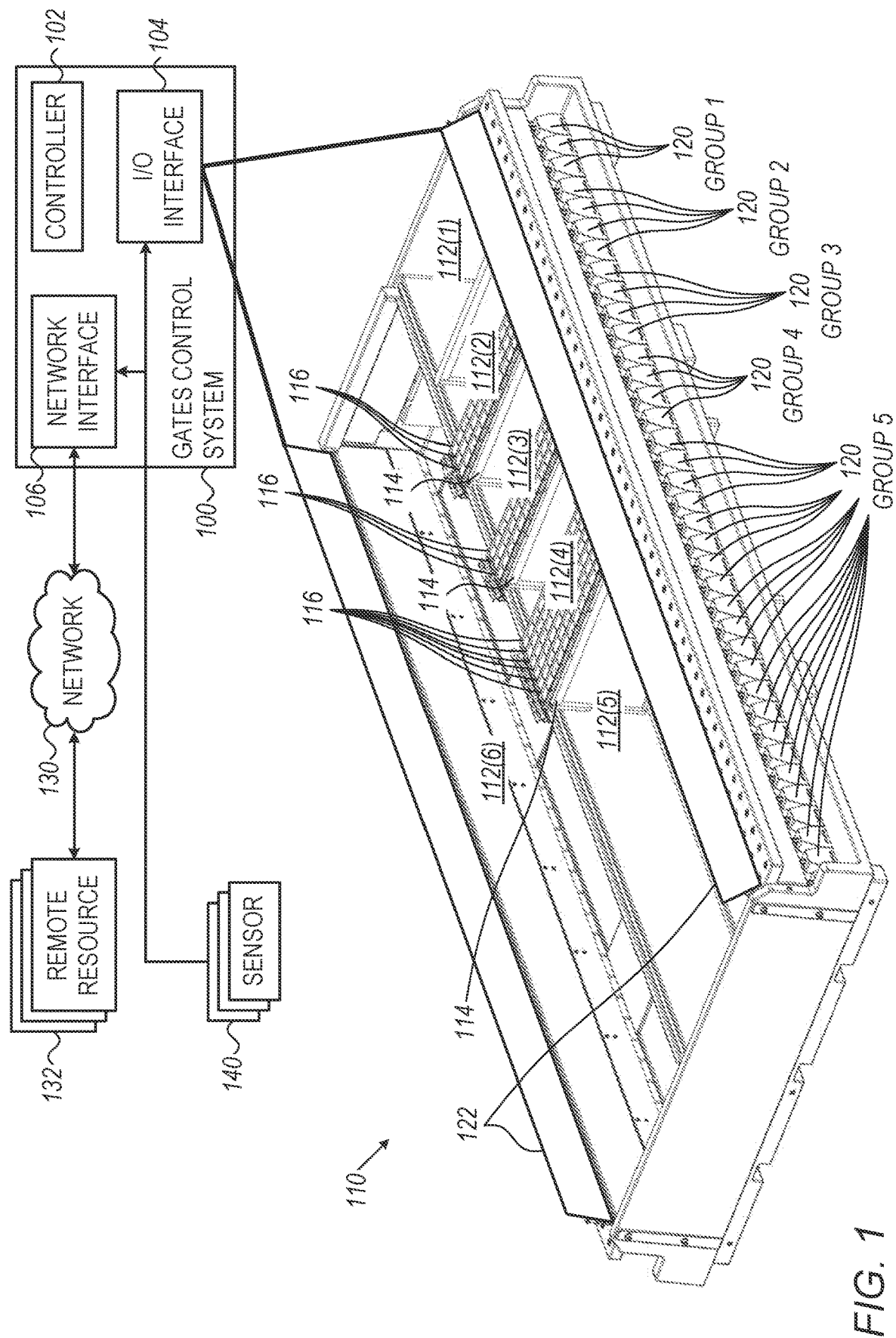
FIG. 1 is a schematic illustration of an exemplary system for controlling individually moveable gates to a habitat of bees comprising one or more beehives, according to some embodiments of the present invention.

The present invention, in some embodiments thereof, relates to controlling bee passage gates in a bees habitat comprising one or more beehives, and, more specifically, but not exclusively, to controlling bee passage gates in a bees habitat comprising one or more beehives where each of the gates is individually moveable separately from the other gates.

According to some embodiments of the present invention, there are provided systems, methods and computer program products for controlling one or more gate arrays of bee passage gates in a bee habitat.

The bee habitat may be an automated bee habitat comprising one or more chambers separated from each other by separators (e.g., partition frames) preventing passage of bees from one chamber to another thus forming a multi-beehive habitat comprising a plurality of chambers, interchangeably designated beehives or simply hives, each hosting a respective bee queen and its colony.

Each chamber may comprise one or more frames, for example, one or more sets of honeycomb frames. The automated bee habitat may optionally include one or more fame mechanisms adapted to remove, insert, replace, and/or move one or more of the frames in one or more of the chambers. Each gate array may comprise a plurality of gates each associated with a respective one of a plurality of bee passage openings enabling bees to enter and exit to/from one or more of the chambers of the habitat. Each of the plurality of gates may be moveable, controlled or manipulated to set the size of its associated respective opening. The size of each opening defined by its moveable associated gate may be set in a predefined range between a minimal size, for example, fully closed opening, and a maximal size, for example, a fully open opening with a plurality of intermediate states between the two extremes.

Specially, each of the gates of each gate array may be individually moveable separately and independently from any other gate of the respective gate array and/or of any another gate array. As such each of the openings to the chamber(s) of the habitat may be set to a different size independently of the other openings.

Optionally, each gate array may be associated with a respective chamber such that all gates of a receptive gate array are associated with openings to receptive chamber (beehive) of the bee habitat.

While each of the gates may be individually moveable, optionally, multiple gates and possibly all of the gates of each gate array may be jointly controlled to set a common size of their associated respective openings. Moreover, assuming there are multiple gate arrays, optionally, all gates of all gate arrays may be jointly controlled to set a common size of all of the openings in the automated habitat. The system may include a controller, for example, a computer, a microcontroller, and/or the like which may operate one or more gate control mechanisms adapted to control each of the plurality of individually moveable gates to set the size of the associated respective opening.

The gate control mechanism(s) may employ one or more designs, forms, and/or architectures for individually controlling each gate to set the size of its associated respective opening, for example, one or more actuators, one or more robotic arms, one or more magnetic elements, one or more extendable and retractable elastic elements, and/or the like.

The controller may operate the gate control mechanism(s) to move one or more of the plurality of gates to set the size of their associated respective openings according to one or more rules, conditions, constraints, scenarios, and/or the like relating to the bee habitat. For example, the controller may control one or more of the gates according to bee traffic in and/or out of one or more of the chambers.

In another example, the controller may control one or more of the gates according to one or more environmental conditions relating to an external environment of the bee habitat, for example, weather conditions such as for example, light, temperature (heat, cold), wind, humidity, precipitation (rain, snow, hail, etc.), and/or the like. In another example, the controller may control one or more of the gates according to one or more constraints defining one or more (internal) environmental conditions inside one or more chambers of the bee habitat, for example, light (illumination), temperature, humidity, ventilation, and/or the like. In another example, detecting that bees are inactive, e.g., when it rains or it's cold, the controller may automatically and autonomously close some or even all openings (entrances) to the bee habitat.

In another example, the controller may autonomously or automatically control one or more of the gates in response to detection of one or more threats to the bee habitat, for example, wax moth, hornets, drones, fire, thieves, and/or the like. In another example, the controller may control one or more of the gates in response to detection of distribution of one or more potentially harmful substances and/or agents in a vicinity of the bee habitat, for example, pesticides, herbicides, fertilizers, fire extinguishing materials, and/or the like.

In another example, the controller may control one or more of the gates in preparation for one or more maintenance operations in the bee habitat, for example, clearing one or more of the chambers, removing, adding, replacing, and/or cleaning one or more frames in one or more chambers, and/or the like.

The gate arrays comprising individually moveable gates to set the size of their associated respective openings in the automated bee habitat may present major advantages compared to existing beehives having openings which are typically permanently open and at best can be manually blocked using by a simple mechanical or electrical means.

First, the individually moveable gates of the gate array(s) may enable independent and precise control over the size of each opening to the bee habitat which in turn may significantly improve management of the bee population within the habitat. For example, one or more gates may be individually controlled to increase the size of one or more respective openings of one or more chambers to prevent "traffic jams" at the entrance and/or exit of one or more chambers, which may be temporary and/or time-specific, and enable swift and quick flow of bees traffic in and/or out of the chambers. In another example, one or more gates may be individually controlled according to activity of bees in one or more of the chambers, for example, increase openings size when high activity is detected and reduce openings size when low activity is detected.

Moreover, individual control of each gate independent of the other gates may significantly increase flexibility in operating the bee habitat, for example, keeping its internal environment within parameters defined by one or more constraints. For example, ventilation and air flow may be optimized by controlling one or more gates according to wind, such that a precise air flow may be maintained through the chambers of the bee habitat. In another example, one or more gates may be at least partially open to release heat from one or more of the chambers in case their internal temperature exceeds a certain threshold. Similarly, one or more gates may be at least partially closed to prevent cold air from entering one or more of the chambers in case their internal temperature drops below a certain threshold.

Furthermore, individually controlling each gate may significantly increase robustness, immunity, security, and/or safety of the bee habitat in general and of the bee population in particular. For example, one or more gates may be automatically controlled to close the openings of one or more of the chambers in response to detection of one or more conditions, threats, events and/or potential hazards, for example, extreme weather conditions, presence of wax moth, hornets or drones near the bee habitat, fire, thieves, pesticides, herbicides, fertilizers, fire extinguishing materials, and/or the like which may be detected, for example, based on sensory data captured by sensors deployed to monitor the bee habitat and/or from one or more other resources.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a schematic illustration of an exemplary system for controlling individually moveable gates to a habitat of bees comprising one or more beehives, according to some embodiments of the present invention.

An exemplary gate control system 100 may be deployed to control one or more gate arrays in a bee habitat 110, specifically an automated bee habitat. For clarity, an internal view of the bee habitat 110 is shown in FIG. 1, in which the habitat's exterior, for example, exterior surfaces, walls, elements, and/or the like are removed.

Optionally, the bee habitat 110 may be a multi-hive habitat comprising and/or be divided to include one or more chambers 112 each hosting a respective bee queen and its colony. For example, multiple chambers, interchangeably designated beehives, may be formed in the bee habitat 110 via one or more separation frames 114 placed in the bee habitat 110 to prevent passage of bees between the chambers 112. Moreover, the separation frames 114 may be removable to enable flexible arrangement and rearrangement of the multiple chambers (beehives) in the bee habitat.

Each chamber 112 may comprise one or more frames, for example, a honeycomb frame 116 on which the bees of the respective colony may build a honeycomb for storing honey, larvae, and/or pollen.

For example, the habitat 110 may include six chambers 112, namely a first chamber 112(1), a second chamber 112(2), a third chamber 112(3), a fourth chamber 112(4), a fifth chamber 112(5) and a sixth chamber b112(6). As seen chambers 112(1), 112(5) and 112(6) are inactive and thus contain no honeycomb frames 116 while the chamber 112(2)

comprises three honeycomb frames 116, the chamber 112(3) also comprises three honeycomb frames 116, and the chamber 112(4) comprises six honeycomb frames 116.

The bee habitat 110 may be constructed to support easy, fast, and simple loading and unloading of frames, i.e., moving, removing, inserting, extracting, replacing, and/or otherwise locating and/or relocating one or more frames 116 in the bee habitat 110 which may significantly increase flexibility in arrangement of the chambers 112 in the bee habitat 110, simplify maintenance, and/or improve extraction of honey from the chambers. For example, one or more separation frames 114 may be loaded to form one or more chambers 112 in the bee habitat 110. In another example, one or more honeycomb frames 116 may be loaded into and/or removed from one or more of the chambers 112. As described herein after, a robot 200 shown in FIG. 2, interchangeably referenced herein after as frame loader 200, may insert and/or extract frames 116 and/or carry frames 116 to/from an inspection and/or treatment unit or chamber in the bee habitat 110.

The bee habitat 110 may employ one or more designs, constructions, and/or forms to support loading and unloading of frames 116. For example, the bee habitat 110 may include a railed structure in its interior space such that one or more frames, for example, a separation frame 114, a honeycomb frame 116, and/or the like may be loaded and/or unloaded into rails of the structure. Each frame 116 may therefore comprise one or more mechanical provisions, for example, mechanical "ears" shaped to mechanically attach to the rails.

The railed structure which may be produced of one or more materials, for example, a metal, a polymer, wood, a complex material, etc., and/or a combination thereof, may take one or more forms. For example, the railed structure may comprise a plurality of vertical rails, which may be arranged in pairs opposite one another such that a frame may be loaded and/or unloaded in each pair of vertical rails of the rail structure from the top and/or bottom. In another example, the railed structure may comprise a plurality of horizontal rails, which may be arranged in pairs opposite one another such that a frame may be loaded and/or unloaded in each pair of vertical rails of the rail structure from the side.

The automated bee habitat 110 may optionally, include one or more automated frame mechanisms, for example, a frame loader adapted to automatically, optionally under control of controller 102, load, move, remove, insert, replace, and/or otherwise locate/relocate one or more frames in the bee habitat 110.

Figure 2:
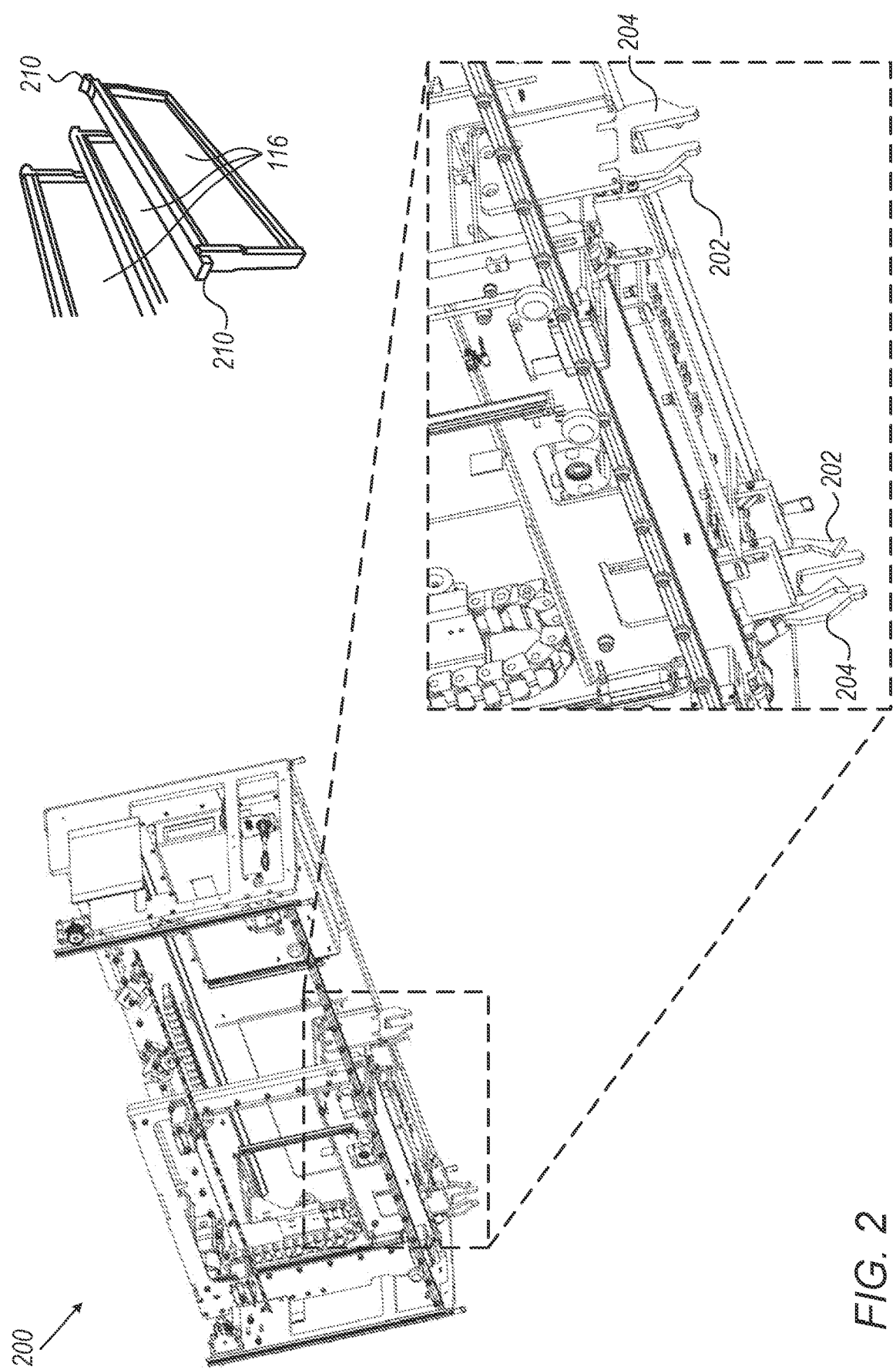
FIG. 2 is a schematic illustration of an exemplary automated frame loader adapted to place and/or remove frames in one or more beehives in a habitat of bees, according to some embodiments of the present invention.

Reference is now made to FIG. 2, which is a schematic illustration of an exemplary automated frame loader adapted to load frames in an automated habitat of bees, according to some embodiments of the present invention.

An exemplary automated frame loader (robot) 200 deployed in an automated bee habitat such as automated bee habitat 110 may be adapted to load and/or unload one or more frames such as frames 116 in the bee habitat 110.

For example, the frame loader 200 may be operated to load, or insert, one or more separation frames 114 to form one or more chambers 112 in the bee habitat 110. In another example, the frame loader 200 may be operated to remove one or more separation frames 114 of a certain chamber 112 and re-insert at different locations in the rail structure load to adjust (increase, decrease) the size of the certain chamber 112.

In another example, the frame loader 200 may be operated to load (insert) one or more honeycomb frames 116 into a certain chamber 112. In another example, the frame loader 200 may be operated to unload (remove) one or more honeycomb frames 116 from a certain chamber 112 in order to extract honey and/or for maintenance, for example, cleaning, disinfection, ventilation, and/or the like which may be optionally conducted in a designated extraction and/or maintenance area inside and/or adjacent to the bee habitat 110.

As seen in 200A which is an exploded view of part of the exemplary frame loader 200, the frame loader 200 may be equipped with means to grab, grip, clutch, snatch, and/or otherwise securely hold one or more frames and move them in the bee habitat 110 to load and/or unload them in one or more designated locations in the bee habitat 110. For example, the frame loader 200 may comprise one or more frame clasps, clamps or jaws, collectively designated clasps 202 adapted to hold, grip or secure a frame 116 in a secure manner while extracting it the from a chamber 112, inserting it into a chamber 112 and/or moving or relocating it in the bee habitat 110. In particular, the clasps 202 may be adapted to grip and hold a frame 116 via a pair of mechanical "ears" 210 of the frame 116 shaped to be clasped by the clasps 202 as illustrated by the white arrows at the frame loader and corresponding black arrows at the frame 116. In another example, the frame loader 200 may further comprise one or more mechanical means, for example, a shaking element 204 which may be configured to shake and/or rattle the clutched frame 116 in order to release it from its rails to which it may stick due to wax, pollen, and/or the like. In some embodiments, shaking element 204 may be used in order to separate or unglue frames 210. For example, frame loader 200 may be lowered such that jaws or shaking element 204 are placed on both sides of a frame 210 and frame loader 200 may then move sideways, e.g., slightly left then slightly right, such that a frame 116 caught by jaws 204 is forced to move sideways and is thus unglued from adjacent frames 116 as well as from a support and/or rail on which the frame 116 rests.

Moreover, the robotic frame loader 200 may internal to the bee habitat 110 such that any of its operations, for example, moving, removing, inserting, extracting, replacing, and/or otherwise locating and/or relocating one or more frames 116 and/or separation frames 114 may be done internally within the bee habitat 110 without exposing bees to external conditions outside the bee habitat 110. Moreover, the robotic frame loader 200 may be operated in conjunction with the gate control system 100 such that prior to one or more operations of the frame loader 200, the gate control system 100 may be operated to close at least some and possibly all of the gates 120 such that the robotic frame loader 200 may not expose bees to external conditions.

Reference is made once again to FIG. 1.

Each of the gate arrays of the bee habitat 110 may comprise a plurality of gates 120 each associated with a respective one of a plurality of openings configured and/or formed in the habitat 110 for passage of bees into and out of the chambers 112. In particular, each of the gates 120 may be individually moveable independently of all other gates 120, to set a size of its associated respective opening.

One or more mechanical structures, designs, and/or concepts may be applied to implement the gates 120 such that they may adjust the size of their associated openings. For example, one or more of the gates 120 may move vertically with respect to their openings, for example, upwards/downwards thus covering their associated openings and enlarging or diminishing the opening's size according to their position with respect to the opening. In another example, one or more of the gates 120 may move horizontally with respect to their openings, for example, sideways (left/right) thus covering their associated openings and enlarging or diminishing the opening's size according to their position with respect to the opening. In another example, one or more of the gates 120 may employ one or more swivel doors which are rotatable such that they may enlarge/diminish the size of their associated opening according to rotation with respect to a plane of their respective opening.

As stated herein before, all the gates 120 may be part of a single gate array of the habitat 110 and/or the habitat 110 may include a plurality of gate arrays each comprising a respective subset of the plurality of gates 120.

Optionally, each gate array may be associated with a respective chamber 112. For example, a first gate array associated with the first chamber 112(1) may comprise a group 1 of three gates 120. In another example, a second gate array associated with the second chamber 112(2) may comprise a group 2 of four gates 120. In another example, a third gate array associated with the third chamber 112(3) may comprise a group 3 also comprising four gates 120. In another example, a fourth gate array associated with the fourth chamber 112(4) may comprise a group 4 of five gates 120. In another example, a fifth gate array associated with the fifth chamber 112(5) may comprise a group 5 of twenty gates 120.

An array of gates as referred to herein may be dynamically defined, e.g., by a user. For example, a set of twenty gates 120 may be logically divided into two arrays of gates, a first array ranging from gate one to gate thirteen (1-13) and a second array ranging from gate fourteen to gate twenty (14-20). The two gate arrays may correspond to two different chambers (hives) 112 respectively. The two hives 112 may comprise frames 116 one to thirteen (1-13) and frames 116 fourteen to twenty (14-20) respectively. Accordingly, to open or close openings to these hives 112, arrays of gates 120 may be controlled as a units, e.g., in order to open entrances to the first hive 112, the first array may be opened. Such definition or configuration of arrays may ease operation of the bee habitat 110. For example, arrays of gates 120 may be associated with hives 112 and thus, in order to open or close a hive 112, the respective array of gates 120 may be opened or closed. Accordingly, a user may, with a single click on an interface button in a graphical user interface (GUI) presented by a client device, e.g., on a screen of a remote server, open or close a hive 112 in the bee habitat 110.

The gate control system 100 may include a mechanism 122, interchangeably designated gate control mechanism, comprising one or more elements adapted to individually control each of the individually moveable gates 120 to set the size of the associated respective opening.

The gate control system 100 may further include a controller 102 for operating the gate control mechanism 122 to control and move the gates 120 for setting the size of the bee passage openings to the habitat 110, an Input/Output (I/O) interface 104 for connecting to the gate control mechanism 122.

The I/O interface 104 may include one or more wired and/or wireless I/O interfaces, ports and/or interconnections, for example, a Universal Serial Bus (USB) port, a serial port, a Bluetooth (BT) interface, a Radio Frequency (RF) interface, a Wireless Local Area Network (WLAN, e.g. Wi-Fi), and/or the like.

Via the I/O interface 104, the gate control system 100, specifically the controller 102 may communicate with the gate control mechanism 122 and operate them to move one or more of the gates 120 to set the size of the associated receptive openings.

Via the I/O interface 104, the gate control system 100, specifically the controller 102 may also communicate with one or more sensors 140 deployed to monitor the bee habitat 110, for example, an imaging sensor, a proximity sensor, an environment condition (e.g., temperature, humidity, etc.) sensor, and/or the like to receive sensor data relating to the bee habitat 110.

One or more of the sensors 140 may be internal, located inside the bee habitat 110 while one or more sensors 140 may be external, that is, located outside of the habitat 110. For example, one or more sensors 140 may be deployed and/or placed inside the bee habitat 110 and may sense, monitor and/or report one or more conditions inside the habitat 110, for example, temperature, air flow direction and speed, humidity, substance composition of air, and/or the like. In another example, one or more internal sensors 140 may monitor motion and/or sound inside the habitat 110. In another example, one or more sensors 140 may be placed outside the habitat 110 and may provide readings or values of one or more conditions outside the bee habitat 110, for example, outside temperature, humidity, wind characteristics, weather conditions, substance carried by air outside the habitat, and/or the like.

The controller 102, may comprise one or more processors, microcontrollers, logic circuits, and/or the like configured to execute one or more software modules, for example, a process, a script, an application, an agent, a utility, a tool, an Operating System (OS), a service, a plug-in, an add-on and/or the like each comprising a plurality of program instructions. The program instructions of the software module(s) may be stored in one or more non-transitory storage mediums (program store) of the gate control system 100, which may be persistent, (e.g., ROM, Flash, hard drive, solid state drive, etc.), and/or volatile (e.g., RAM, cache, etc.).

The controller 102 may optionally include, utilize and/or apply one or more hardware elements of the gate control system 100, for example, a circuit, a component, an Integrated Circuit (IC), an ASIC, an FPGA, a Digital Signals Processor (DSP), a Graphic Processing Unit (GPU), and/or the like.

The controller 102 may therefore execute one or more functional modules utilizing one or more software modules, one or more of the hardware modules and/or a combination thereof. For example, the controller 102 may execute one or more functional modules for operating the gate control mechanism 122 to control each of one or more of the individually moveable gates 120 to set the size of their associated respective openings.

The gate control system 100 may optionally include a network interface 106 comprising one or more wired and/or wireless interfaces for connecting to a network 130 which may include one or more wired and/or wired networks, for example, a Local Area Network (LAN), a WLAN, a Wide Area Network (WAN), a Municipal Area Network (MAN), a cellular network, the internet and/or the like.

Via the network interface 106, the gate control system 100, specifically the controller 102 may communicate with one or more remote networked resources 132, for example, a server, an online service, a cloud service and/or platform, and/or the like. Moreover, via the network interface 106, the gate control system 100 may optionally communicate with one or more of sensors 140, for example, one or more sensors 104 having network connectivity.

Optionally, operating the gate control mechanism 122 to move one or more of the gates 120 may be distributed between the local controller 102 and one or more remote controllers and/or computing systems which may communicate with the local controller 102 over the network 130, for example, a remote server 132, and/or one or more cloud computing services and/or platforms such as, for example, an Infrastructure as a Service (IaaS), a Platform as a Service (PaaS), a Software as a Service (SaaS) and/or the like deployed over one or more cloud computing platforms such as, for example, Amazon Web Service (AWS), Google Cloud, Microsoft Azure and/or the like. For example, a remote server may, in response to input from a user, communicate with controller 102 over network 130, and command controller 102 to open or close one or more gates 120.

In such distributed control embodiments, the local controller 102 may communicate with the remote controller via the network 130 to receive commands for operating one or more of the gates 120 and may operate the gate control mechanism 122 accordingly to move the one or more gates 120 to set the size of the associated respective openings.

Additionally, the local controller 102 may receive instructions for controlling the gate array(s) from one or more remote client devices, for example, a server, a computer, a mobile device (e.g., Smartphone, tablet, etc.), and/or the like used by one or more users. One or more of the users may communicate with the controller 102, via one or more applications executed by their associated client devices, over the network 130 to instruct the controller 102 to operate the gate control mechanism 122 to control and move one or more of the gates 120 to set the size of their associated respective openings to one or more chambers 112 of the bee habitat 110.

As described herein before, each of the plurality of gates 120 may be individually moveable to set the size of its associated respective opening to one of the chambers 112 (beehives) of the bee habitat 110. In particular, each individually moveable gate 120 may be controlled to set the size of its associated respective opening in a predefined range. For example, the predefined range may extend between a minimal size, in which the respective opening is fully closed, and a maximal size, in which the respective opening is fully open.

Moreover, in addition to fully closing and fully opening associated respective opening, each of the individually moveable gates 120 may be controlled, by the gate control mechanism 122, to set the size of its associated respective opening in a plurality of intermediate states within the predefined range between the minimal size and the maximal size. The predefined range may be continuous such that each gate 120 may be moved to set its associated respective opening in practically any size within the predefined range. However, the predefined range may comprise a plurality of discrete intermediate states which may be set buy the gates 120.

Since the gate control mechanism 122 may be operated to individually control and move each of the gates 120 to a set a different size of its respective opening, at least some openings may have different sizes. However, optionally, the gate control mechanism 122 may be operated to jointly control and move together a group of gates 120 to set o set a common size of their respective openings. Moreover, the gate control mechanism 122 may be optionally operated to jointly control and move together all of the gates 120 of one or more gate arrays too set a common size to all of the openings associated with the gates 120 of the respective gate array.

Figure 3A:
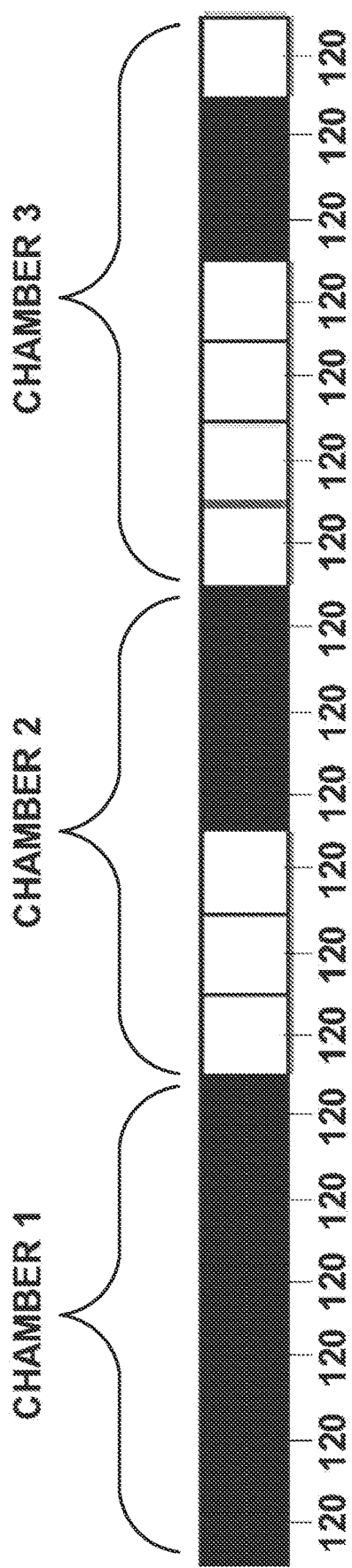
FIG. 3A and FIG. 3B are schematic illustrations of a plurality of openings to one or more beehives of a bee habitat each having a size controlled by individually moveable gates, according to some embodiments of the present invention.
Figure 3B:
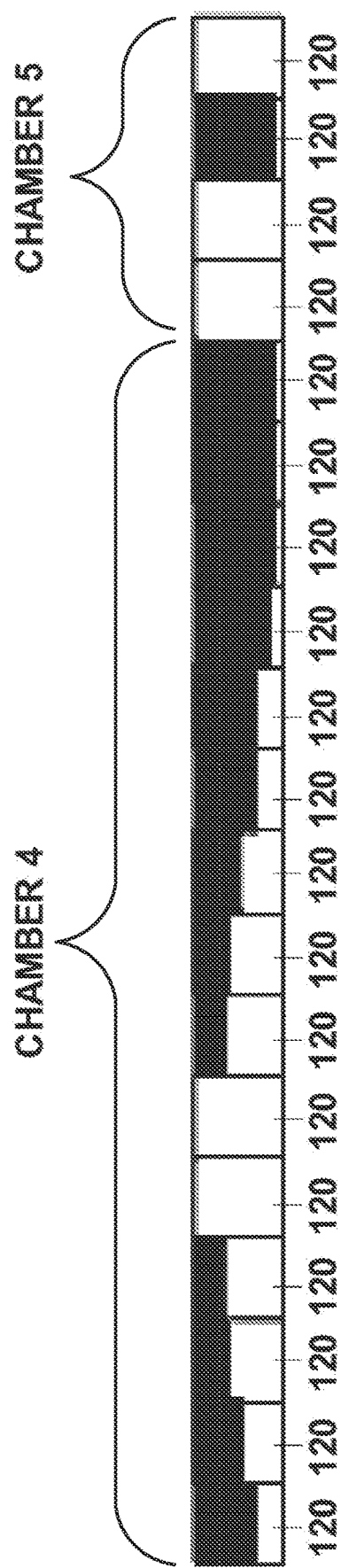

Reference is now made to FIG. 3A and FIG. 3B, which are schematic illustrations of a plurality of openings to one or more beehives of a bee habitat each having a size controlled by individually moveable gates, according to some embodiments of the present invention.

One or more gate arrays of a bee habitat such as bee habitat 110 may each comprise a plurality of gates such as gates 120. Each of the plurality of gates 120 may be associated with a respective opening to one of one or more chambers 112 (beehives) of the bee habitat 110. Different gates 120 in an array may have, or be of, different sizes. For example, a first gate 120, when opened, may provide an opening or entrance of a first size and a second gate 120 in the same array and/or in another array may, when opened, provide a second opening or entrance of a different size, e.g., twice the size of the first opening or entrance. Accordingly, it will be understood that an array of gates as described herein may include one or more gates 120 that may be of one or more sizes, for example, a bee habitat 110 may include, on each of its sides, an array of: forty gates 120 or twenty gates 120 or two gates 120 or even a single gate 120, all of which may function and/or be operated or controlled as described herein with respect to gates 120. For example, instead of a plurality of gates 120, a single wide or large gate 120, e.g., one the size of the combined sizes of gates 120 in groups 1 to 5 in FIG. 1, may be used, and such wide, single gate 120 may be controlled as described herein to adjust the size of multiple openings to the bee habitat 110.

Optionally, each gate array may be associated with a respective chamber 112 (beehive), e.g., the gates 120 of each gate array may be associated with opening to the respective chamber 112. For example, as seen in FIG. 3A, a first gate array associated with a first chamber 112 (chamber 1), and a second gate array associated with a second chamber 112 (chamber 2) may each comprise six gates 120 while a third gate array associated with a third chamber 112 (chamber 3) may comprise seven gates 120. In another example, as seen in FIG. 3B, a fourth gate array associated with a fourth chamber 112 (chamber 4) may comprise fifteen gates 120 while a fifth gate array associated with a fifth chamber 112 (chamber 5) may comprise four gates 120.

As described herein before, a controller such as controller 102 may operate one or more gate control mechanisms such as gate control mechanism 122 to individually control and move each of the plurality of gates 120 and set the size of the respective opening. As such the plurality of gates 120 may be controlled to set common and/or different sizes to their respective openings.

For example, as seen in FIG. 3A, all of the gates 120 of the gate array associated with the first chamber (chamber 1) may be jointly controlled to set a common size to all of the openings to the first chamber, specifically the minimal size such that all the openings to the first chamber are fully closed. In another example, a first subset of three gates 120 of the gate array associated with the second chamber (chamber 2) may be controlled to set a common size to three receptive openings, specifically the maximal size such that the respective openings are fully open while a second subset of three gates 120 of this gate array are controlled to set a common size to three receptive openings, specifically the minimal size such that the respective openings are fully closed. In another example, five gates 120 of the gate array associated with the third chamber (chamber 3) may be controlled to set the maximal size of their respective openings such that these openings are fully open while two other gates 120 of this gate array are controlled to set the minimal size to their receptive openings such that these openings are fully closed.

In another example, as seen in FIG. 3B, each of the fifteen gates 120 of the gate array associated with the fourth chamber (chamber 4) may be individually controlled to set a different size of its associated respective opening. In another example, three gates 120 of the gate array associated with the fifth chamber (chamber 5) may be controlled to set a common size to three receptive openings, specifically the maximal size such that the respective openings are fully open while a fourth gate 120 is controlled to set a different size of its receptive opening, specifically an intermediate state in which the receptive opening is almost fully closed.

Reference is made once again to FIG. 1.

The gate control mechanism 122 may employ one or more technologies, architectures, and/or structures, for example, actuators, robotic elements, magnetic elements, elastic elements and/or the like. It should be noted that the disclosed gate control mechanism 122 described herein are exemplary and should not be construed as limiting since, as may become apparent to a person skilled in the art, other implementations of the gate control mechanism 122 may be devised to achieve the same objective of individually controlling each of the gates 120.

For example, one or more exemplary gate control mechanisms 122 may comprise one or more actuators which may be operated to control one or more of the gates 120 which are individually moveable and controllable separately from the other gates 120. For example, the actuator(s) may be arranged and/or configured to directly control each gate 120 to adjust and/or set the size of its associated opening. In another example, the actuator(s) may be arranged and/or configured to control (e.g., move, advance, rotate, etc.) one or more mechanical elements (e.g., arm, lever, rod, etc.) which may be mechanically coupled to one or more gates, optionally in a releasable manner, and may thus control one or more of the gates 120 to adjust and/or set the size of its associated opening.

One or more other exemplary gate control mechanisms 122 may use magnetic force to control the movement of each of the plurality of individually moveable gates 120 to set the size of respective openings to one or more chambers such as chambers 112. For example, the gate control mechanisms 122 may comprises one or more first electromagnetic elements, for example, a coil, a core, and/or the like operable by the controller 102, for example, via an electric current, to induce a magnetic field in one or more directions. Each of the plurality of gates 120 may have one or more second electromagnetic elements mechanically coupled to the gate 120. The first and second electromagnetic element(s) may be deployed and/or arranged such that a magnetic field induced by the first electromagnetic element(s) may have a vector which may move the second magnetic element(s) of one or more selected gates 120 of the plurality of gates 120 such that the selected gates 120 may move with respect to their associated respective openings and set their size accordingly.

In another example, one or more other gate control mechanisms 122 may use and/or comprise one or more elastic elements, for example, a spring, an elastic band, and/or the like for controlling movement of each of the plurality of individually moveable gates 120 to set the size of respective openings to one or more chambers 112. The elastic element(s) may be extendable and retractable for moving each of the gates 120 to set the size of its associated respective opening. For example, the gate control mechanisms 122 may comprises one or more elastic elements mechanically coupled to each of the plurality of gates 120. The controller may operate one or more mechanisms, for example, an actuator, a pulley, a weight, and/or the like to extract and/or retract the elastic element(s) to move one or more of the gates 120 and set the size of its associated respective opening accordingly.

Figure 4A:
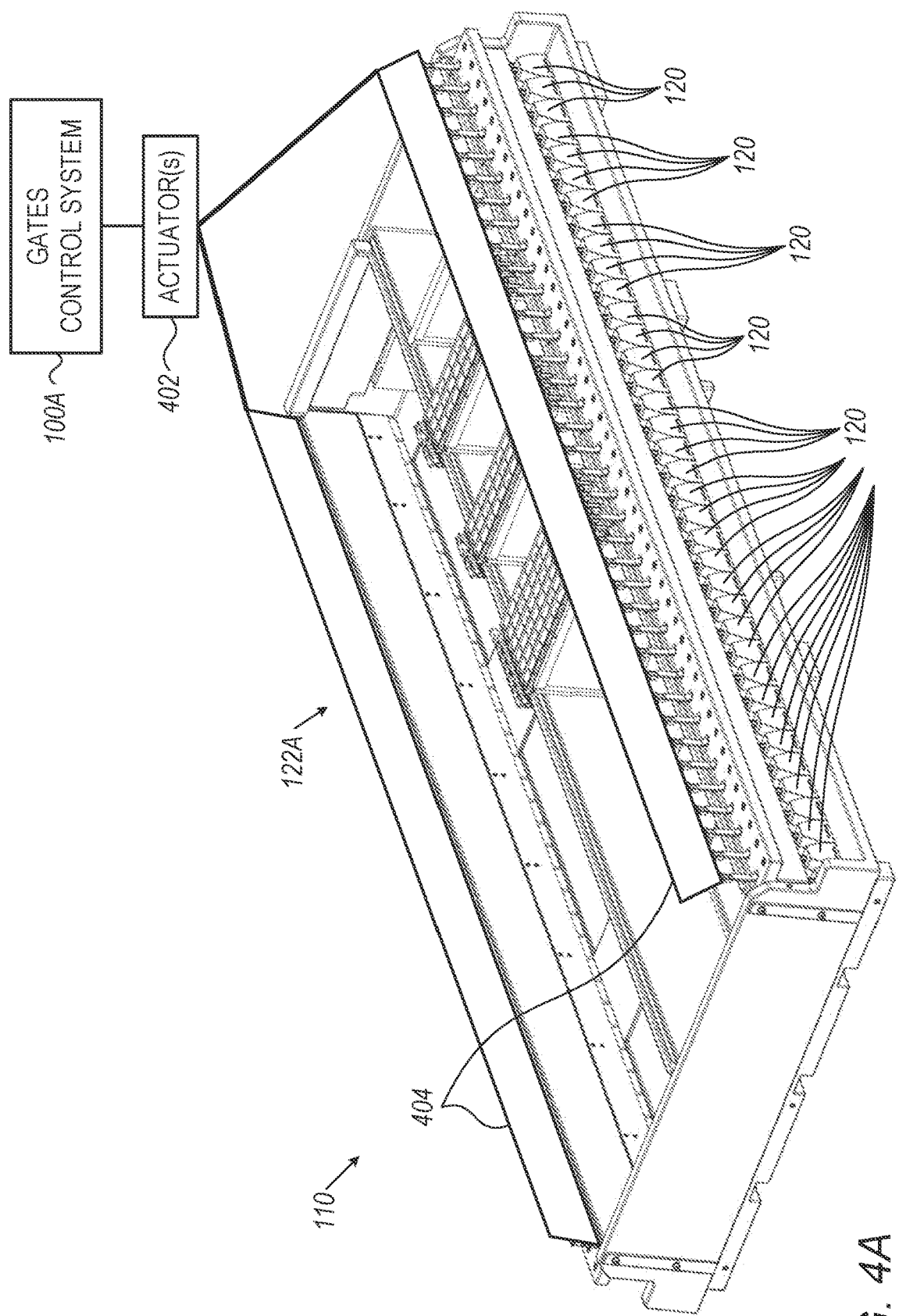
FIG. 4A and FIG. 4B are schematic illustrations of exemplary gate control mechanisms of a system for controlling individually moveable gates to a habitat of bees comprising one or more beehives, according to some embodiments of the present invention.
Figure 4B:
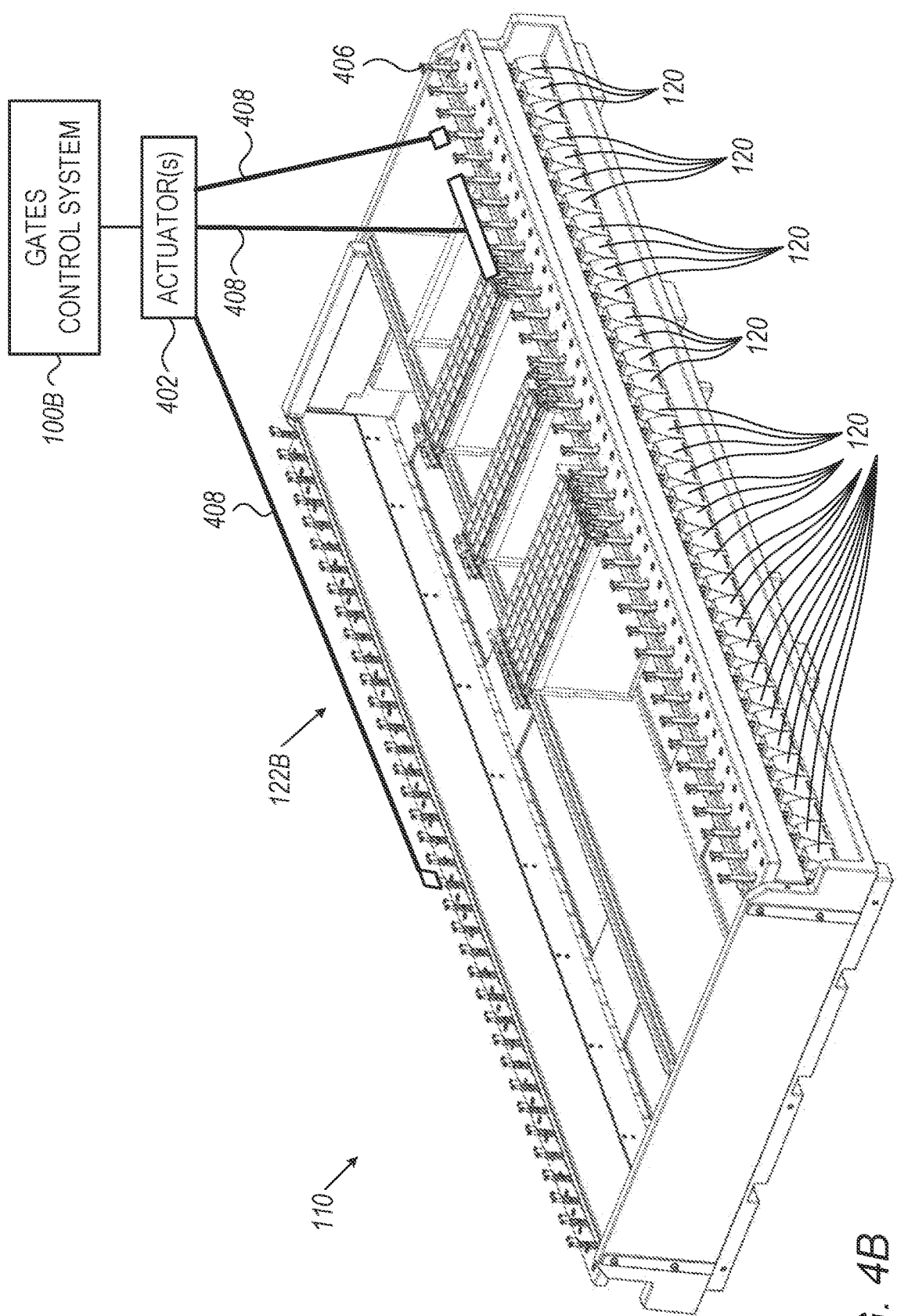

Reference is now made to FIG. 4A and FIG. 4B, which are schematic illustrations of exemplary gate control mechanisms of a system for controlling individually moveable gates to a habitat of bees comprising one or more beehives, according to some embodiments of the present invention.

As seen in FIG. 4A, a gate control system 100A such as gate control system 100 deployed in a bee habitat such as the bee habitat 110 may comprise an exemplary gate control mechanism 122A such as mechanism 122 controlling movement of a plurality of gates such as the individually moveable gates 120 to set the size of respective openings to one or more chambers such as chambers 112 (beehives).

In particular, the gate control mechanism 122A may comprise one or more actuators 402 and one or more mechanical elements 404, for example, a metal bar, a plastic strip, and or the like which may be mechanically coupled to the plurality of moveable gates 120. For example, two mechanical elements 404 may be deployed at two sides of the bee habitat 110 such that each mechanical element 404 is mechanically coupled to all of the gates 120 located at the respective side of the habitat 110.

The actuator(s) 402 may employ one or more technologies and may include, for example, a motor, an electric motor (e.g., servomotor, step-motor, etc.), a hydraulic actuator, a pneumatic actuator, and/or the like.

A controller such as controller 102 may control, operate and/or communicate with the actuator(s) 402 via one or more interfaces provided by an I/O interface such as the I/O interface 104 of the gate control system 100.

One or more structures, designs and/or implementations may be applied for mechanically coupling the mechanical element 404 to the gates 120. For example, the mechanical element 404 may be mechanically coupled to each of the gates 120 via a rod 406 having a distal end mechanically coupled to the respective gate 120 and a proximal end releasable coupled to the mechanical element 404. The rod 406 which may be produced of one or more materials, for example, metal, polymer, complex material, and/or the like.

Moreover, the mechanical element(s) 404 and/or the actuator(s) 402 may be designed, deployed, and/or operated to enable individual moment of each of the plurality of gates 120 independently of any of the other gates 120. For example, the mechanical element 404 may comprise a plurality of lift elements each connected to the proximal end of the rod 406 of a respective gate 120. The lift element may be operable by the actuator(s) 402 to lift and/or lower the rod 406 of one or more gates 120 thus opening and/or closing respectively the opening associated with the respective gates 120.

The lift element of each gate 120 may be connected to the actuator(s) 402 and/or the respective rod 406 in a releasable manner, for example, a lock element (e.g., clutch). Therefore, when the lock element of a respective gate 120 is in a connected mode and the rod 406 is mechanically coupled to the actuator(s) 402, the respective gate 120 may be moved by the actuator(s) 402 to lift and/or lower the rod 406 the respective gate 120. However, when the lock element of a respective gate 120 is in a disconnected mode and the rod 406 is released from the actuator(s) 402, the respective gate 120 may not move even when the actuator(s) are working.

In order to avoid clutter in FIG. 4A and provide a clear view, only the rod 406 of the first gate 120 is indicated by a numeral. However, the actuator(s) 402 may be releasable coupled to each of the gates 120 via similar rods 406.

As seen in FIG. 4B, another exemplary gate control system 100B such as the gate control system 100 may comprise a gate control mechanism 122B such as gate control mechanism 122 may comprising a robot having one or more robotic arms 408 which may be operated, for example, moved, positioned and/or navigated by one or more actuator(s) such as actuator 402. Each robotic arm 408 may be therefore navigated by the actuator(s) 402 to mechanically couple to the proximal end of the rod 406 of one or more gates 120. This means, that one or more of the robotic arms 408 may be capable to mechanically couple to a single rod 406 of a single gate 120 at any given time while one or more the robotic arms 408 may be capable to mechanically couple simultaneously to the rods 406 of multiple gates 120.

Another exemplary gate control mechanism 122 (not shown) may comprise a plurality of actuator(s) 402 deployed in the bee habitat 110 where each actuator 402 may be directly coupled to the rod 406 of a single gate 120 and may be adapted to control and individually move the respective gate 120 to adjust and/or set the size of the associated opening.

Reference is now made to FIG. 5, which is a schematic illustration of exemplary robot adapted to releasable attach and control individually moveable gates to a habitat of bees comprising one or more beehives, according to some embodiments of the present invention.

An exemplary an exemplary gate control system such as gate control system 100 may comprise a gate control mechanism 122 utilizing a frame loader (robot) such as frame loader 200 for automatically controlling each of a plurality of gates such as gates 120 to set the size of receptive openings to one or more chambers such as chamber 112 of a bee habitat such as automated bee habitat 110.

As described herein before, each rod 406 may have a distal end 410 mechanically coupled to a respective gate 120 and a proximal end 412 which may be mechanically coupled, typically in a releasable manner, to the frame loader 200 which may be thus operated to move the rod 406 and hence move, for example, lift and/or lower the respective gate 120.

The proximal end 412 may be therefore shaped, adapted and/or designed such that clasps such as the clasps 202 of the frame loader 200 may mechanically couple, for example, clutch, grip and/or hold the proximal end 412 in a sufficiently secure and robust grip to enable movement of the respective gate 120 as indicated by the a pair of white arrows at the frame loader in FIG. 2 and corresponding white arrows at the rod 406 in FIG. 5. As such, the frame loader 200 (robot) may be operated, optionally by the gate control system 100 to mechanically attach to the proximal end 412 of one or more rods 406 in order to move one or more respective gates 120.

A body 414 of the rod 406 may be adapted, configured and/or formed for deployment in the bee habitat 110, for example, in a dedicated tunnel, groove, and/or the like.

A proximal end 412 of the rod 404 may be shaped, configured and/or otherwise adapted to connect to the actuator(s) 402, for example, via a mechanical element 406, via a robotic arm 408, and/or the like. Specifically, the proximal end 412 may be shaped and configured to be releasable coupled to the actuates(s) 402. For example, the proximal end 412 may comprise one or more mechanical provisions, for example, a depression, a slot, a protrusion, a cavity, and/or the like shaped and configured to interlock with one or more complementing mechanical provisions disposed on the actuates(s) 402, the mechanical element 406, and/or the robotic arm 408 such that the actuates(s) 402, the mechanical element 406, and/or the robotic arm 408 may automatically connect (couple) to each rod 404 and disconnect (release) from each rod 404.

Reference is now made to FIG. 6, which is a flowchart of an exemplary process of controlling individually moveable gates to a habitat of bees comprising one or more beehives, according to some embodiments of the present invention.

An exemplary process 600 may be executed by a controller such as controller 102 of a gate control system such as gate control system 100 deployed in a bee habitat such as bee habitat 110 comprising one or more chambers such as chamber 112 (beehive) to operate a mechanism such as gate control mechanism 122 for controlling movement of a plurality of gates such as individually moveable gates 120 to set the size of respective openings to one or more of the chambers 112.

As stated herein before, the process 600 may be executed entirely by the controller 102 deployed in the bee habitat 110 and/or jointly, in a distributed manner, with one or more remote controllers and/or computing systems, for example, a remote server, a cloud service, and/or the like.

Moreover, the process 600 is described for controlling the gates 120 of a single bee habitat 110. However, as may become apparent to a person skillet in the art, the process 600, specifically when executed remotely may be easily scaled, and expanded to a plurality of bee habitats 110.

As shown at 602, the process 600 may start with the controller 102 receiving information relating to the bee habitat 110 and/or to the bee population residing in the bee habitat 110 which as described herein before may include one or more colonies each populating a respective chamber 112 (beehive) of a multi-beehive habitat 110. The received information may relate to many aspects concerning the bee habitat 110 and/or the bee population.

For example, the received information may comprise bee traffic or activity information derived from sensory data captured by one or more sensors 140 of the automated bee habitat 110. The sensors 140 may include, for example, one or more imaging sensors such as, for example, a camera, a video camera, a sound sensor (e.g., microphone, etc.), a thermal imaging sensor, an infrared sensor, and/or the like adapted to capture imagery data in and/or around the bee habitat 110. In another example, the sensors 140 may include one or more motion sensors, proximity sensors, and/or the like which may capture bee's presence, activity, movement, and/or traffic.

The controller 102 may directly communicate with the sensor(s) 140, for example, via one or more interfaces of the I/O interface 104, to receive their sensory data. In another example, the controller 102 may receive the traffic information from one or more other units, systems, and/or controllers controlling the bee habitat 110 which may receive the sensory data from the sensors 140.

In another example, the received information may relate to environmental conditions and/or relating to an external environment of the automated bee habitat 110, for example, light, temperature, humidity, and/or the like including weather conditions such as, for example, wind, precipitation (rain, snow, hail, etc.), and/or the like.

The controller 102 may receive the environmental conditions information from one or more environmental sensors 140, for example, a temperature sensor, a light meter, a humidity sensor, and/or the like deployed to measure such conditions outside the bee habitat 110. In another example, the controller 102 may receive the environmental conditions information from one or more remote resources such as the remote resources 132 via a network such as the network 130. For example, the controller 102 may communicate with one or more weather servers, online weather services (e.g., websites), and/or the like to fetch environmental conditions information relating to the area of the bee habitat 110. The environmental information may further relate to environmental conditions inside the bee habitat 110, specifically inside one or more of the chambers 112, for example, light (illumination), temperature, humidity, ventilation (air flow, etc.), and/or the like which may be measured by one or more environmental sensors 140 deployed inside the bee habitat 110.

In another example, the received information may relate to one or more threats to the bee habitat 110 and/or to the bee population. Such threats information may be indicative of one or more threats in vicinity, proximity, and/or inside the bee habitat 110, for example, presence of wax moth, hornets, drones, fire, potential thieves, and/or the like.

Provided with information relating to internal conditions in the bee habitat 110 (e.g., extracted from sensory data captured by sensors 140) and/or information relating to external, global or outside conditions (e.g., from remote resources 132), an automated bee habitat 110 equipped with the gate control system 100 may be completely autonomous in the sense the automated beehive 110 may automatically and autonomously respond to conditions and changes related to any aspect relevant to the beehive 110. For example, the automated bee habitat 110 may autonomously and automatically operate gates 120 to shut entrances of the operate gates 120 when it rains, gets too cold or when hazardous materials are sensed around the automated bee habitat 110. In another example, the automated bee habitat 110 may automatically and autonomously operate gates 120 to open entrances when conditions are right for bees to exit the beehive(s) (chamber) 112 of the bee habitat 110, and/or partially open some of the openings in order to maintain a proper temperature inside beehive 112 and so on.

The controller 102 may derive such threat information from sensory data captured by one or more sensors 140 deployed inside and/or outside the bee habitat 110, for example, an imaging sensor, and/or the like. In another example, the controller 102 may receive the threat information from one or more extremal units, systems, and/or controllers of the bee habitat 110. In another example, the controller 102 may receive the threat information from one or more remote resources 132, for example, an online fire watch service, an online police activity report service, and/or the like.

In another example, the received information may relate to one or more potential hazards which may inflict damage to the bee habitat 110 and/or harm the bee population of the bee habitat 110. Such hazards may be inflicted, for example, by distribution of one or more potentially harmful substances and/or agents in a vicinity of the bee habitat, for example, a pesticide, a herbicide, a fertilizer, a fire extinguishing material, and/or the like.

The controller 102 may derive such hazard information from sensory data captured by one or more sensors 140 deployed inside and/or outside the bee habitat 110, for example, a chemical substance detection sensor, an imaging sensor, and/or the like. In another example, the controller 102 may receive the hazard information from one or more remote resources 132, for example, a pesticide and/or herbicide distribution system, and/or the like which may optionally inform the controller 102 of the potential hazard in advance before destruction of the substance and/or agent.

As shown at 604, the controller 102 may adjust the size of one or more of the openings to one or more of the chambers 112 according to the received information. In particular, the controller 102 may operate the gate control mechanism 122 to control and move one or more of the individually moveable gates 120 to set the size of respective openings according to the received information.

For example, assuming that based on analysis of the traffic information, the controller 102 identifies a "traffic jam" at the entrance and/or exit of a certain chamber 112 meaning that many bees are simultaneously attempting to enter and/or exit the chamber 112 and are unable to do so due to the large congregation. In such case, the controller 102 may operate the gate control mechanism 122 to move multiple gates 120 to increase the size of their associated respective openings and typically fully open them to enable the bees to more conveniently enter and/or exit the certain chamber 112.

In another example, while it may be desirable to keep the openings of one or more beehives 112 to a minimum (e.g., in order to keep the bee habitat 110 warm when outside temperature is low) closing the openings may restrict passage of bees. In such case the gates control system 100 may iteratively cause frame loader 200 to slightly diminish the size of openings (e.g., by lowering some of gates 120), determine whether the passages are congested (e.g., based on images or other sensors' data) and repeat such operation until reaching the minimal size of openings that allows free, uninterrupted passage of bees. It is noted that congestion control as described may be done at frame level, not just chamber or hive level. For example, if more bees are active in a first frame 116 than in a second frame 116 of the same chamber (hive) 112, then one or more gates 120 leading to the first frame 116, and/or proximal to it, may be operated to open their respective openings wider than openings of gates 120 which lead to the second frame 116 and/or are closer or near the second frame 116.

In yet another example, openings to the bee habitat 110 may be set such that bees are directed to specific frames 116. For example, when one or more new frames 116 are added and/or included in an existing beehive 112, in order to direct bees to the newly added frames 116, one or more gates 120 may be controlled to increase the size of openings leading to the newly added frames 116 compared to openings leading to other frames 116 in the beehive 112 thus encouraging bees to access the newly added frames 116.

In another example, assuming that based on analysis of the traffic information, the controller 102 identifies that the activity inside a certain chamber 112 is very low, for example, since there are no or very little bees inside the chamber 112, the bees in are in low activity state, and/or the like. In such case, the controller 102 may operate the gate control mechanism 122 to move one or more gates 120 to decrease the size of their associated respective openings and thus reduce potential external threats to the bees inside the bee habitat 110. Moreover, immediately following detection of a threat, the controller 102 may automatically and autonomously operate the gate control mechanism 122 in real-time, or near real-time to move gates 120 and close the openings move gates 120 thus immediately responding to the threat in real-time and significantly reducing exposure time of the bee habitat 110 to the external threat.

In another example, assuming that based on analysis of the environmental conditions information, the controller 102 identifies a heavy rain, hail and/or strong wind in the environment of the bee habitat 110. In such case, the controller 102 may operate the gate control mechanism 122 to move multiple gates 120 to decrease the size of their associated respective openings and typically fully close them to reduce effect and/or possible damage by the rain, hail and/or wind to the bee habitat 110 and/or the bees inside it.

In another example, the controller 102 may determine it is dark outside the bee habitat 110 and may operate the gate control mechanism 122 to move gates 120 to decrease the size of their associated openings since bees are typically inactive during dark. The controller 102 may use one or more methods to determine it is dark outside the bee habitat 110. For example, based on one or more timing parameters, for example, time of day, which may be optionally included in the environmental conditions information, the controller 102 may determine it is currently night time and therefore dark. In another example, the controller 102 may determine it is dark outside based on analysis of sensory data captured by one or more sensors 140, for example, a light sensor, an photo-resistor, and/or the like.

In another example, assuming that based on analysis of the information relating to the environmental conditions inside the bee habitat 110, the controller 102 identifies that a level of one or more environmental conditions exceed one or more constraints defining one or more (proper) environment conditions in one or more of the chambers 112. In such case, the controller 102 may operate the gate control mechanism 122 to control one or more of the gates 120 in attempt to affect the internal environment conditions and bring them to within the defined constraints.

For example, assuming that based on analysis of the environmental conditions information, the controller 102 determines that the temperature inside a certain chamber 112 is above a certain threshold defined by a certain constraint. In such case, the controller 102 may operate the gate control mechanism 122 to move one or more gates 120 to increase the size of their associated respective openings in attempt to release heat from the chamber 112 to the exterior of the bee habitat 110. In another example, assuming that based on analysis of the environmental conditions information, the controller 102 determines that the air flow inside a certain chamber 112 is below a certain threshold defined by a certain constraint. In such case, the controller 102 may operate the gate control mechanism 122 to move one or more gates 120 to increase the size of their associated respective openings in attempt to increase ventilation inside the chamber 112.

In another example, assuming that based on analysis of the threat information, the controller 102 identifies a fire in the area of the bee habitat 110. In such case, the controller 102 may operate the gate control mechanism 122 to move all gates 120 facing the direction of the fire to decrease the size of their associated respective openings and typically fully close them in order to reduce and potentially prevent smoke to enter the chamber(s) 112.

In another example, assuming that based on analysis of the hazards information, the controller 102 identifies that one or more pesticide agents are distributed in dangerous proximity to the bee habitat 110. In such case, the controller 102 may operate the gate control mechanism 122 to move most and optionally all of the gates 120 to decrease the size of their associated respective openings in attempt to prevent the pesticide agent(s) from entering the chamber(s) 112.

According to some embodiments of the present invention, the controller 102 may be adapted to operate the gate control mechanism 122 to control one or more of the gates 120 to set the size of their respective openings in preparation for one or more maintenance operations in the automated bee habitat 110.

For example, assuming one or more honeycomb frames need to be removed from a certain chamber 112, the controller 102 may operate the gate control mechanism 122 to move most and optionally all of the gates 120 corresponding to the chamber 112 to increase the size of their associated respective openings in order to let out as many bees as possible. After detecting low activity inside the chamber 112, indicative there are no or at least very few bees inside the chamber 112, the controller 102 may operate the gate control mechanism 122 to move all of the corresponding gates 120 to close the openings to the chamber 112 such that the honeycomb frame(s) may be safely removed from the chamber 112 without harming bees which may be otherwise present in the chamber 112.

In another example, assuming all chambers 112 of the bee habitat 110 have to be disinfected against one or more pesticides. In such case, the controller may operate the gate control mechanism 122 to move all of the gates 120 in the bee habitat 110 to fully open all openings and let out all bees. After detecting the outgoing bee traffic is diminished, the controller 102 may operate the gate control mechanism 122 to move all of the gates 120 to close the openings thus prevent the bees from entering the chambers(s) 112 while disinfected.

In another example, assuming that the robotic frame loader 200 needs to be operated to locate, remove, and/or relocate one or more honeycomb frames 116, specifically without exposing bees to external conditions outside the bee habitat 110. Moreover, as described herein before, the frame loader 200 may be internal inside the bee habitat 110, such that it may be adapted and operated to locate/re-locate frames 116 inside the bee habitat 110. In such case, the frame loader 200 may be operated in conjunction with the gate control system 100 such that prior to operating the frame loader 200, the gate control system 100 may be operated to close at least some and possibly all of the gates 120 such that when the robotic frame loader 200 is operated to locate/re-locate frames 116, bees within the bee habitat 110 are not exposed to external conditions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms sensor, and I/O interface are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for controlling at least one array of bee passage gates in an automated bee habitat, comprising:
   at least one gate array, each thereof comprising a plurality of gates each associated with a respective one of a plurality of openings configured for bees passage to a respective one of at least one chamber of an automated bee habitat, and wherein each of the gates is individually moveable, independently of all other gates, to set a size of a respective associated opening of the plurality of openings;
   at least one mechanism adapted to control each of the plurality of gates independently of the other gates; and
   a controller adapted to operate the at least one mechanism to control at least one of the plurality of gates to set the size of the respective opening.

2. The system of claim 1, wherein each of the plurality of gates is individually moveable to set the size of the respective opening in a predefined range.

3. The system of claim 2, wherein the predefined range extends between a minimal size in which the respective opening is fully closed and a maximal size in which the respective opening is fully open.

4. The system of claim 1, wherein at least some of the plurality of gates are each individually moveable to set different sizes of respective at least some openings.

5. The system of claim 1, wherein the at least one mechanism is adapted to jointly control the plurality of gates together to set a common size of the plurality of openings.

6. The system of claim 1, further comprising a plurality of gates arrays each comprising a respective plurality of gates moveable to set the size of a respective plurality of openings to a respective chamber of the bee habitat, the gates of each of the plurality of gate arrays are controllable independently of any other of the plurality of gate arrays.

7. The system of claim 1, wherein the at least one mechanism comprises at least one actuator mechanically coupled to each of the plurality of gates via a rod having a distal end mechanically coupled to the respective gate and a proximal end releasable coupled to the at least one actuator for moving the rod to set the size of the respective opening.

8. The system of claim 1, wherein the at least one mechanism comprises at least one electromagnetic element operable to induce a magnetic field having a vector for moving at least one magnetic element mechanically coupled to each of the plurality of gates for moving the respective gate to set the size of the respective opening.

9. The system of claim 1, wherein the at least one mechanism comprises at least one elastic element mechanically coupled to each of the plurality of gates, the at least one elastic element is extendable and retractable for moving the respective gate to set the size of the respective opening.

10. The system of claim 1, wherein the at least one chamber comprises at least one set of honeycombs frames.

11. The system of claim 1, wherein the controller is adapted to operate the at least one mechanism to control at least one of the plurality of gates to set the size of the respective opening according to bee traffic information derived from sensory data captured by at least one sensor deployed to monitor the automated bee habitat.

12. The system of claim 1, wherein the controller is adapted to operate the at least one mechanism to control at least one of the plurality of gates to set the size of the respective opening according to at least one environmental condition relating to an external environment of the automated bee habitat.

13. The system of claim 1, wherein the controller is adapted to operate the at least one mechanism to control at least one of the plurality of gates to set the size of the respective opening according to at least one constraint defining at least one environment condition in the at least one chamber.

14. The system of claim 1, wherein the controller is adapted to operate the at least one mechanism to control at least one of the plurality of gates to set the size of the respective opening in response to detection of at least one threat to the automated bee habitat.

15. The system of claim 1, wherein the controller is adapted to operate the at least one mechanism to control at least one of the plurality of gates to set the size of the respective opening in response to detection of distribution of at least one potentially harmful substance in a vicinity of the automated bee habitat.

16. The system of claim 1, wherein the controller is adapted to operate the at least one mechanism to control at least one of the plurality of gates to set the size of the respective opening in preparation for at least one maintenance operation in the automated bee habitat.

17. A method of controlling at least one array of bee passage gates in an automated bee habitat, comprising:
- operating by at least one controller at least one mechanism adapted to control at least one gate array, each thereof comprising a plurality of gates each associated with a respective one of a plurality of openings configured for bees passage to a respective one of at least one chamber of an automated bee habitat;
- wherein the operating comprising individually moving a respective one of the plurality of gates, independently of all other gates, to set a size of a respective associated opening of the plurality of openings.

18. The system of claim 1, wherein the automated bee habitat comprising a plurality of chambers separated from each other by one or more removable separation frames.

19. The system of claim 1, wherein each of the at least one chamber forms a respective beehive separated from other ones in the automated bee habitat.

20. The method of claim 17, wherein each of the at least one chamber forms a respective beehive separated from other ones in the automated bee habitat.

* * * * *